(12) United States Patent
Zimmerman et al.

(10) Patent No.: US 11,892,973 B2
(45) Date of Patent: Feb. 6, 2024

(54) EMULATION OF CODE-DESCRIPTION TABLES ON SQL DATABASES USING ENUM DATA TYPE

(71) Applicant: Western Digital Technologies, Inc., San Jose, CA (US)

(72) Inventors: Israel Zimmerman, Ashdod (IL); Eyal Hakoun, Gesher Haziv (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 166 days.

(21) Appl. No.: 17/181,910

(22) Filed: Feb. 22, 2021

(65) Prior Publication Data

US 2022/0121618 A1 Apr. 21, 2022

Related U.S. Application Data

(60) Provisional application No. 63/094,722, filed on Oct. 21, 2020.

(51) Int. Cl.
| | | |
|---|---|---|
| G06F 16/11 | (2019.01) | |
| G06F 16/23 | (2019.01) | |
| G06F 16/22 | (2019.01) | |
| G06F 16/21 | (2019.01) | |

(52) U.S. Cl.
CPC ......... *G06F 16/116* (2019.01); *G06F 16/119* (2019.01); *G06F 16/213* (2019.01); *G06F 16/2282* (2019.01); *G06F 16/2379* (2019.01)

(58) Field of Classification Search
CPC .. G06F 16/213; G06F 16/2282; G06F 16/211; G06F 16/116
See application file for complete search history.

(56) References Cited

U.S. PATENT DOCUMENTS

| | | | |
|---|---|---|---|
| 2006/0112329 A1* | 5/2006 | Collie | G06F 40/18 715/209 |
| 2009/0327343 A1* | 12/2009 | McCormack | G06F 16/258 |
| 2011/0010402 A1* | 1/2011 | Takeuchi | G06F 16/284 707/812 |
| 2014/0012884 A1* | 1/2014 | Bornea | G06F 16/211 707/798 |
| 2014/0280139 A1* | 9/2014 | Hade | G06F 16/284 707/737 |
| 2016/0321375 A1* | 11/2016 | Liu | G06F 16/88 |
| 2017/0024383 A1* | 1/2017 | Cheung | G06F 16/212 |

(Continued)

*Primary Examiner* — Robert W Beausoliel, Jr.
*Assistant Examiner* — Pedro J Santos
(74) *Attorney, Agent, or Firm* — PATTERSON + SHERIDAN, LLP; Steven H. VerSteeg (57) ABSTRACT

A method and apparatus for converting code-description table data to an enumerated data type in a schema record referencing the code-description table. A record of a table is identified that references the code-description table, and a portion of a schema describing the record is updated to include the relevant data of the code-description table as an enumerated type of the record schema. The enumerated type schema element includes data elements of the code-description table relevant to the record, each element having its own type. As additional records of the same table that are related to the code-description table are called, the enumerated type schema element may be updated to include additional code-description table data elements.

20 Claims, 6 Drawing Sheets

(56) References Cited

U.S. PATENT DOCUMENTS

2017/0220606 A1* 8/2017 Wang ..................... G06N 5/04
2018/0349463 A1* 12/2018 Bernhardy ............ G06F 16/213
2020/0349130 A1* 11/2020 Bracholdt ........... G06F 16/2282

* cited by examiner

```
syntax = "proto2";

package tutorial;

message Person {
    required string name = 1;
    required int32 id = 2;
    optional string email = 3;

enum PhoneType {
        MOBILE = 0;
        HOME = 1;
        WORK = 2;
    } message PhoneNumber {
        required string number = 1;
        optional PhoneType type = 2 [ default = HOME ];
    } repeat PhoneNumber phones = 4;

EMULATION OF CODE-DESCRIPTION TABLES ON SQL DATABASES USING ENUM DATA TYPE

CROSS-REFERENCE TO RELATED APPLICATIONS

This application claims benefit of U.S. provisional patent application Ser. No. 63/094,722, filed Oct. 21, 2020, which is herein incorporated by reference.

BACKGROUND OF THE DISCLOSURE

Field of the Disclosure

Embodiments of the present disclosure generally relate to serializing data, and more particularly, to serializing code-description tables of a relational database.

Description of the Related Art

Current computing/storage architectures store and process data in different architectural units. For example, a database is typically stored in a data storage device. In order to carry out operations on records of the database, the data is copied to host device memory where the operation (e.g., select, insert, update, delete) is performed on the data using host processor resources. When the operation is completed, the data storage device is updated with the updated state of the data (for insert, update, or delete), while the result of the operation is returned to the host.

Code-description tables are frequently used in relational databases to store descriptive values that may be relatively static. While these tables carry out important functions, there is a significant amount of processing overhead and related power requirements required to maintain the relationships to other tables. These can include table updates to the code-description table and tables that utilize the code-description table data, and movement of code-description tables in and out of memory during host processing operations.

What is needed are systems and methods that enable the data tables requiring access to code-description table data to continue this access, while removing the overhead associated with maintenance of the code-description table and relationships to other tables.

SUMMARY OF THE DISCLOSURE

The present disclosure generally relates to systems and methods for converting code-description table data to an enumerated data type in a schema record referencing the code-description table. A record of a table is identified that references the code-description table, and a portion of a schema describing the record is updated to include the relevant data of the code-description table as an enumerated type of the record schema. The enumerated type schema element includes data elements of the code-description table relevant to the record, each element having its own type. As additional records of the same table that are related to the code-description table are called, the enumerated type schema element may be updated to include additional code-description table data elements.

In one embodiment, a data storage device is disclosed, including one or more memory modules, and a controller comprising a processor configured to perform a method for data schema detection and migration. In embodiments, the method includes identifying in portion of a file, a reference to a code-description table comprising a plurality of descriptors, creating a schema for the portion of the file, the schema comprising a schema element comprised of two or more of the plurality of descriptors, converting the file to a table according to the schema, and storing the table and schema in the one or more memory modules.

In another embodiment, a controller for a data storage device is disclosed, that includes an I/O to one or more memory devices, and a processor configured to execute a method for data schema detection and migration. In embodiments, the method includes receiving a portion of a file comprising a plurality of records, detecting a reference in one of the records to a code-description table, defining a schema for the file based on the data types in at least one record of the plurality of records, comprising at least one schema element comprising at least two descriptors of the code-description table, and storing data from the file and the schema in the one or more memory devices.

In another embodiment, a system for storing data is disclosed, that includes one or more memory means, and an SSD controller means configured to carry out a method for data schema detection and migration. In embodiments, the method includes detecting field hierarchy of a file and a reference to a code-description table, defining a schema means based on the field hierarchy, the schema comprising a schema element describing a portion of the code-description table comprising a plurality descriptors, and defining a data table based on the schema means and the file.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure generally relates to systems and methods for converting code-description table data to an enumerated data type in a schema record referencing the code-description table. A record of a table is identified that references the code-description table, and a portion of a schema describing the record is updated to include the relevant data of the code-description table as an enumerated type of the record schema. The enumerated type schema element includes data elements of the code-description table relevant to the record, each element having its own type. As additional records of the same table that are related to the code-description table are called, the enumerated type schema element may be updated to include additional code-description table data elements.

Figure 1:
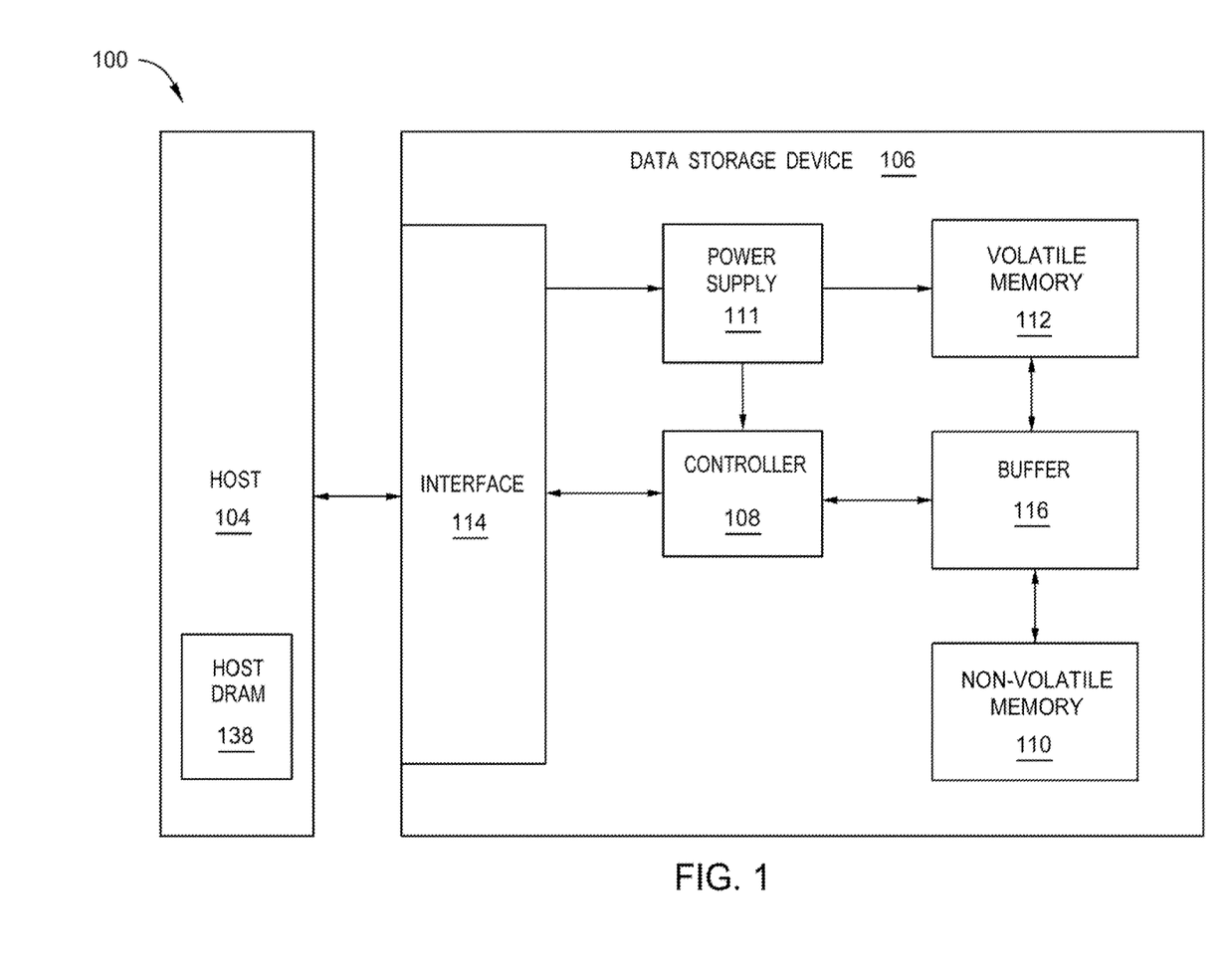
FIG. 1 is a schematic block diagram illustrating a storage system in which a data storage device may function as the data storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104, which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
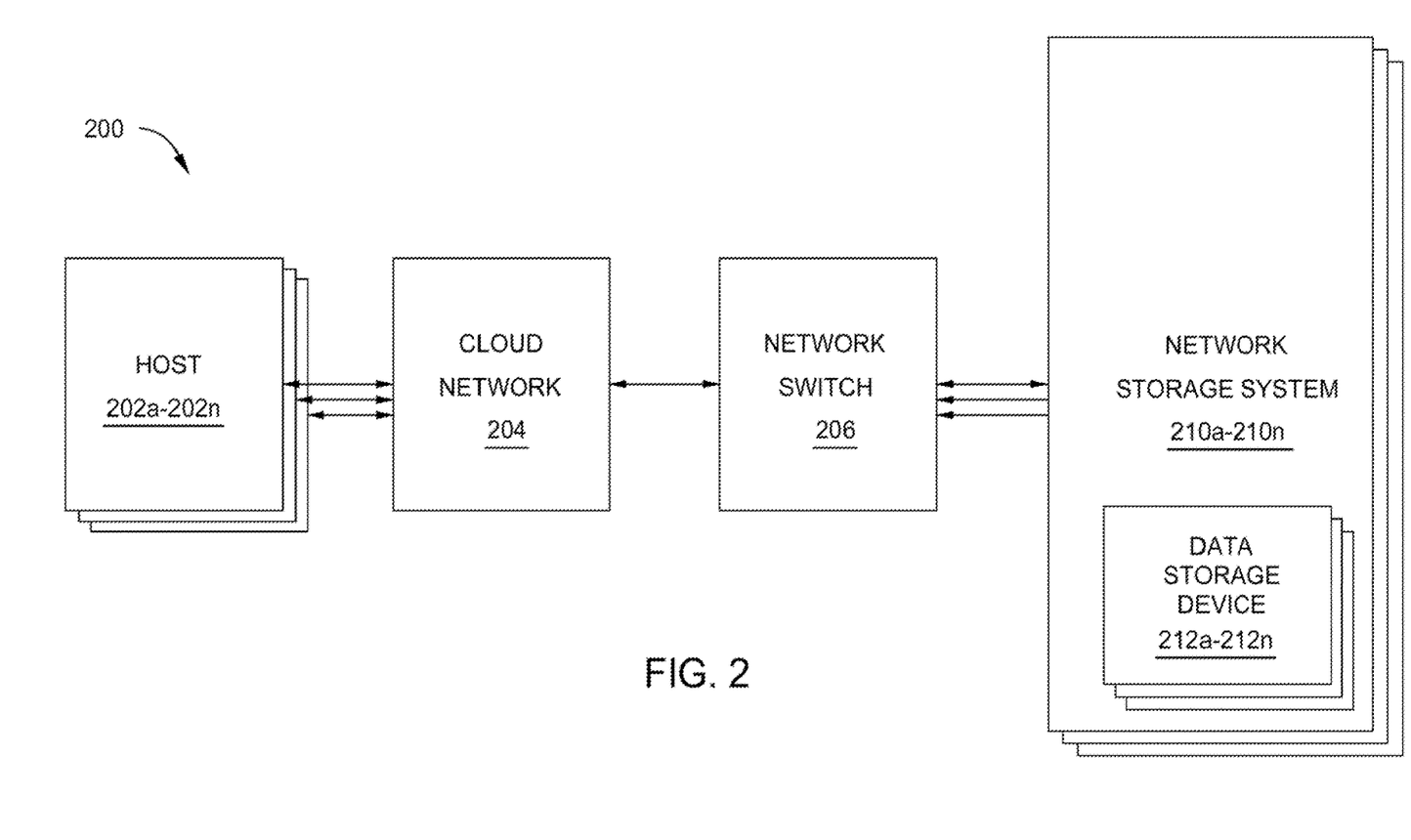
FIG. 2 is a schematic block diagram illustrating a database server system, according to disclosed embodiments.

FIG. 2 is a schematic block diagram illustrating a database server system 200, according to disclosed embodiments. The database server system includes one or more host devices 202a-202n, where each of the one or more host devices 202a-202n may be the host device 104 of FIG. 1, a cloud network 204, a network switch 206, and one or more network storage systems 210a-210n. Each of the network storage systems 210a-210n includes one or more data storage devices 212a-212n, where each of the one or more data storage devices 212a-212n may be the data storage device 106 of FIG. 1 or 304 of FIG. 3, discussed below.

The one or more host devices 202a-202n may be connected to the cloud network 204 via methods of network data transfer, such as Ethernet, Wi-Fi, and the like. The cloud network 204 is connected to the network switch 206 via methods of network data transfer, such as Ethernet, Wi-Fi, and the like. The network switch 206 may parse the incoming and outgoing data to the relevant location. The network switch 206 is coupled to the one or more network storage systems 210a-210n. The data from the one or more host devices 202a-202n are stored in at least one of the one or more data storage devices 212a-212n of the one or more network storage devices 210a-210n.

For example, the one or more network storage systems may be configured to further parse incoming data to the respective one or more data storage devices 212a-212n as well as retrieve data stored at the respective one or more data storage devices 212a-212n to be sent to the one or more host devices 202a-202n. The one or more host devices 202a-202n may be configured to upload and/or download data via the cloud network 204, where the data is uploaded and/or stored to at least one of the one or more data storage devices 212a-212n of the one or more network storage systems 210a-210n. It is to be understood that "n" refers to a maximum number of described components of the database server system 200. For example, the one or more data storage devices 212a-212n may be about 1 data storage device, about 2 data storage devices, or any number greater than about 2 data storage devices.

Figure 3:
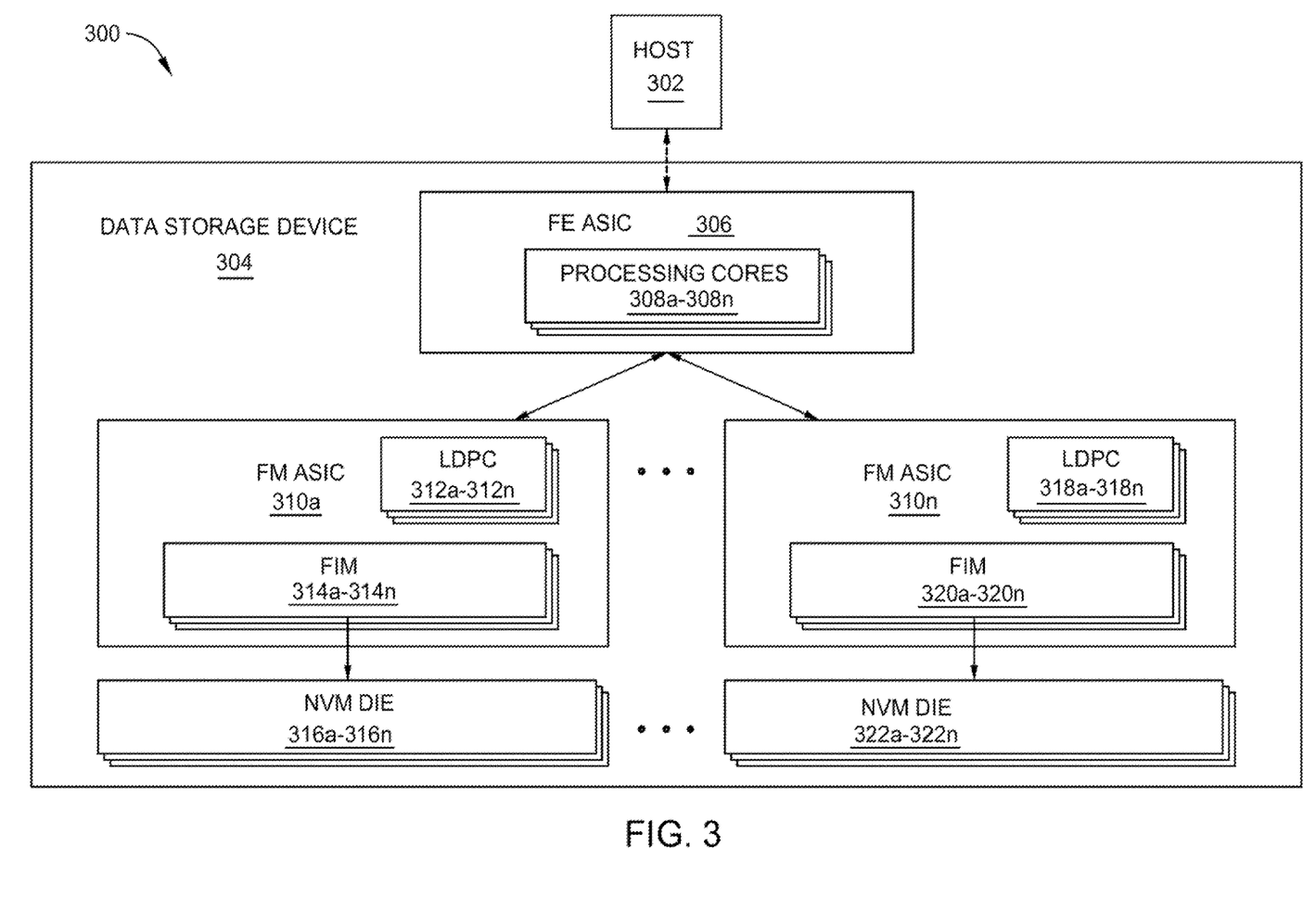
FIG. 3 is a schematic block diagram illustrating an improved data storage device, according to disclosed embodiments.

FIG. 3 is a schematic block diagram of a storage system 300 illustrating an improved data storage device 304, according to disclosed embodiments. The storage system 300 may be the database server system 200 of FIG. 1. For example, the data storage device 304 may be implemented as one or more data storage devices 212a-212n of the one or more network storage systems 210a-210n, and the host device 302 may be implemented as the one or more host devices 202a-202n of FIG. 2. It is to be understood that the data storage device 304 may include additional components not shown in FIG. 3 for the sake of clarity. In one embodiment, the data storage device 304 may be an E1.L enterprise and data SSD form factor (EDSFF).

The data storage device 304 includes a front-end (FE) application-specific integrated circuit (ASIC) 306, a first front-end module (FM) ASIC 310a, and an nth FM ASIC 310n. In the embodiments described herein, the "n" refers to a maximum number of described components of the data storage system 304. For example, the data storage device 304 may include about 10 FM ASICs, where the nth or "n" number of FM ASICs is equal to about 10. The data storage device 304 further includes one or more NVM dies 316a-316n, 322a-322n. Furthermore, the data storage device 304 may include a plurality of FM ASICs (indicated by the ellipses), where each of the FM ASICs of the plurality of FM ASICs is coupled to a respective NVM die of the plurality of NVM dies 316a-316n, 322a-322n. It is to be understood that while a plurality of FM ASICs and a plurality of NVM dies coupled to each of the FM ASICs of the plurality of FM ASICs are described, and the data storage device 304 may include a single FM ASIC coupled to a single NVM die or a single FM ASIC coupled to a plurality of NVM dies. In one embodiment, the NVM is NAND memory, where each of the plurality of NVM dies are NAND dies. In one embodiment, the plurality of NVM dies 316a-316n, 322a-322n of the data storage device 304 are bit cost scalable (BiCS) 6 NVM dies. The BiCS 6 NVM dies may have improved operating speeds, and lower power consumption than previous versions such as BiCS 5 NVM dies.

The plurality of FM ASICs 310a-310n each comprise a plurality of low-density parity-check (LDPC) engines 312a-312n, 318a-318n and a plurality of flash interface modules (FIMs) 314a-314n, 320a-320n. Each of the plurality of FIMs 314a-314n, 320a-320n are coupled to a respective NVM die of the plurality of NVM dies 316a-316n, 322a-322n. In one embodiment, each FIM is coupled to a respective NVM die. In another embodiment, each FIM is coupled to a respective about four NVM dies. The plurality of LDPC engines 312a-312n, 318a-318n, may be configured to generate LDPC codes or parity data. The LDPC codes and the parity data may be attached to the respective incoming data to be written to the respective NVM die of the plurality of NVM dies 316a-316n, 322a-322n. In one embodiment, the FM ASIC includes about 14 LDPC engines. In another embodiment, the FM ASIC includes less than about 54 LDPC engines.

The LDPC codes and the parity data may be utilized to find and fix erroneous bits from the read and write process to the plurality of NVM dies 316a-316n, 322a-322n. In one embodiment, a high failed bit count (FBC) corresponds to an error correction code (ECC) or parity data size of about 10.0%. In another embodiment, a low FBC corresponds to the ECC or parity data size of about 33.3%. When the ECC or parity data size is increased from about 10.0% to about 33.3%, the FBC decreases as the data includes more capability to find and fix failed or erroneous bits. In another embodiment, each NVM die of the plurality of NVM dies 316a-316n, 322a-322n includes between about 10.0% and about 33.3% of ECC or parity data associated with the respective stored data. Furthermore, each NVM die of the plurality of NVM dies 316a-316n, 322a-322n may have a bit error rate (BER) of about 0.2 or less than about 0.2. By including more ECC or parity data with the respective data stored in the NVM dies 316a-316n, 322a-322n, the BER may be decreased or improved, such that the BER has a value closer to about 0. The table below describes a power consumption and read performance improvement by increasing the amount of ECC or parity data to be stored on each NVM die of the plurality of NVM dies 316a-316n, 322a-322n.

TABLE 1

|  | FBC High (ECC size ~= 10.0%) | FBC Low (ECC size ~= 33.3%) |
| --- | --- | --- |
| Read Performance (GB/s) | 1.2 | 4.7 |
| Power Consumption (Watt) | 0.200 | 0.120 |
| NVM Die Per FM | 27 | 7 |
| Total Data Storage Device Capacity (TB) | 5.56 | 4.69 |
| Total Power Consumption (W) | 29.348 | 24.832 |

The listed values in Table 1 are not intended to be limiting, but to provide an example of a possible embodiment. Though the total data storage device capacity is lower when the ECC or parity data size is about 33.3% (i.e., FBC low) than when the ECC or parity data size is about 10.0% (i.e., FBC high), the read performance is increased from about 1.2 GB/s to about 4.8 GB/s, and the power consumption decreases from about 0.200 Watt (using about 10.0% parity size, or high BER engine) to about 0.120 Watt (using about 33.3% parity size, or low BER engine). Thus, the data storage device 304 may have improved power consumption and read performance when the ECC or parity data size is greater.

The FE ASIC 306 includes a plurality reduced instruction set computer (RISC) processing cores 308a-308n. In the description herein, the RISC processing cores 308a-308n may be referred to as processing cores 308a-308n, for exemplary purposes. Although RISC processing cores are described, in embodiments other types of processing cores may be utilized, such as CISC, or other processor architecture. For example, the FE ASIC 306 may include a number of processing cores greater than about 5 processing cores. In another embodiment, the number of processing cores is about 256 processing cores and about 512 processing cores. Each of the plurality of processing cores 308a-308n is configured to receive and execute a database instruction from the host 302. The database instruction may include one of a select, an update, and an insert instruction. The database instruction may further include a delete instruction in addition to the previously mentioned instructions. Furthermore, when receiving a database instruction from the host 302, the FE ASIC 306 may allocate an appropriate number of processing cores of the plurality of processing cores 308a-308n to complete the requested database instructions.

Figure 4:
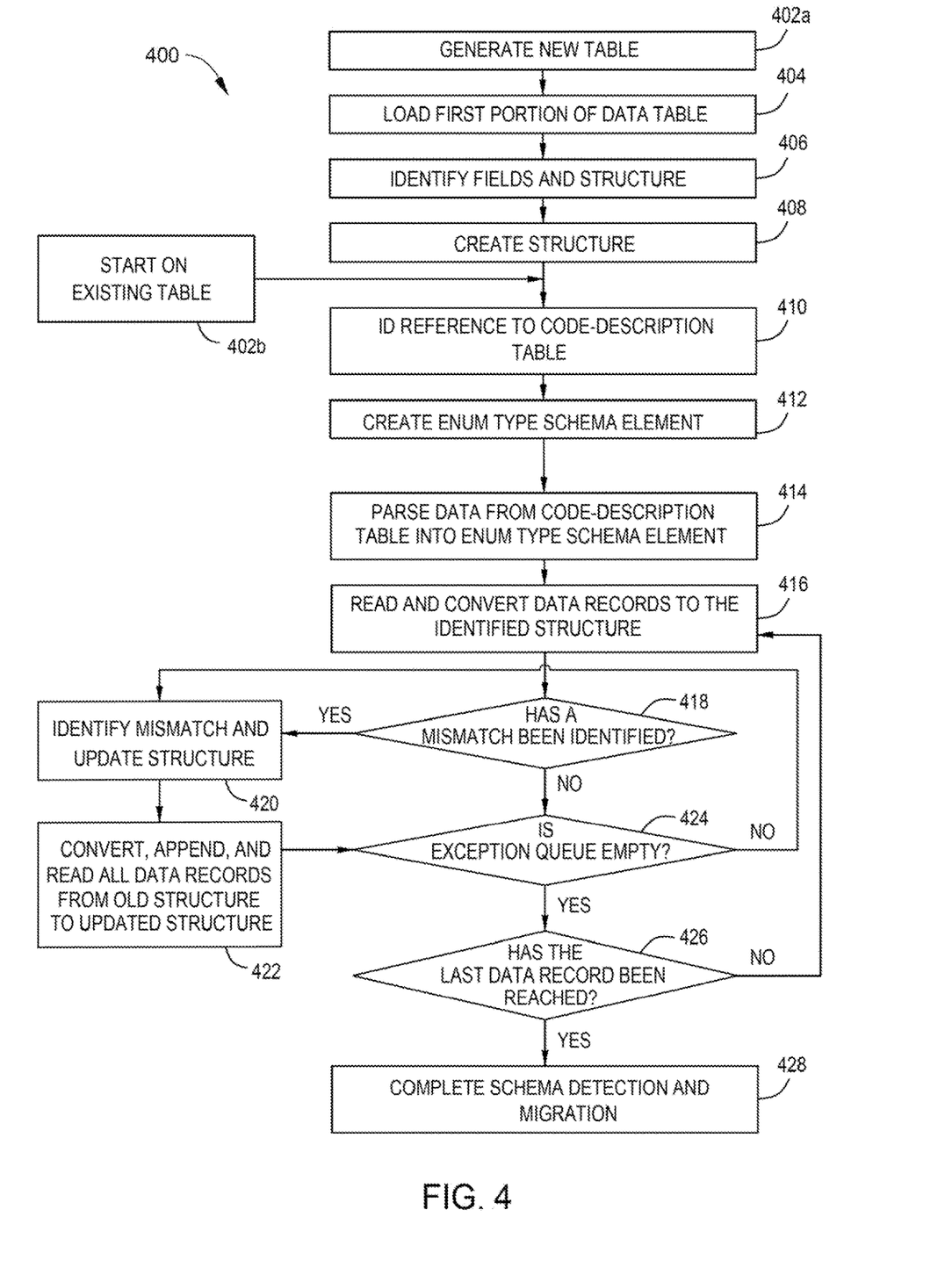
FIG. 4 is a flowchart illustrating a method of an automatic schema detection and migration, according to disclosed embodiments.

FIG. 4 is a flowchart illustrating a method 400 of an automatic schema detection and migration, according to disclosed embodiments. At block 402a, the controller, such as the controller 108 of FIG. 1, and/or the processing cores (referred to as processor for exemplary purposes, herein), such as the processing cores 308a-308n, is configured to generate a new table and related schema, where the number of columns and the data type of the columns are not yet identified. The columns of the table may correspond to the fields, such as the field name, the field type, the field size, a mandatory field, and additional attributes of the columns may include whether or not a field is an optional field and/or a repeated field. However, if an existing table is stored at the memory module, such as one or more NVM dies of the plurality of NVM dies 316a-316n, 322a-322n, the method 400 begins at block 402b and continues to block 410 of the method 400.

At block 404, the first portion of a data table is loaded, where the first portion of the data table is part of a received data file that is schema-less, or of a dynamically typed schema. Although the portion of a data table is disclosed here for at least initial processing, other portion sizes of a file may be utilized, up to and including an entire file. Moreover, although a data table is disclosed here, one of skill in the art will appreciate that other file formats may be parsed in according to embodiments disclosed herein. In embodiments, the file may be in an XML format, JSON format, or other format used for storage of data by a schema-less, or dynamically typed schema, database such as MongoDB. In some embodiments, unstructured and schema-less data may be used in accordance with this disclosure, with data types, field names, etc., being determined programmatically, such as by a lookup table, algorithm, machine learning algorithm (e.g., a classification and/or regression algorithm; via supervised or unsupervised learning methods), or other methods capable of parsing data, determining its type and contents so as to develop a schema for that data. The previously listed size is not intended to be limiting, but to provide an example of a possible embodiment.

At block 406, the controller and/or the processing cores are configured to identify the fields and the structure of the data table. In embodiments, when parsing a schema-less or dynamically typed schema-based database, such as MongoDB, the parsed fields include a field name, a field type, a determination of whether or not a field is a repeated field or an optional field, and the schema structures include a structure name, a structure hierarchy, a repeated structure, and an optional structure. Furthermore, the data table may include a plurality of field-delimited units of document-based data. At block 408, the controller and/or processor generates a structure of a schema according to the identified fields and the structure of the text field. In one embodiment, the structure of the schema is a Protobuf structure, while other embodiments may utilize a different serialized data schema. Furthermore, the generated schema structure is a data serialization structure.

At block 410, the controller and/or the processing cores identify, in a portion of the data table, a reference to a code-description table. The code-description table may be defined by a number of repeated items in the data table, where the number of repeated items has a maximum number of about 20 unique items. The controller and/or the processing cores may utilize the generated schema structure, or existing schema structure for an existing table such as referenced in block 402b, to identify the reference. The code-description table includes a plurality of descriptors, where each descriptor describes or identifies a certain field. For example, a descriptor may be for a field name with a text data type.

At block 412, the controller and/or the processor cores creates an enumerated data (Enum) type schema element for the portion of the data table or data file. The Enum type schema element may include two or more of the plurality of descriptors.

At block 414, the controller and/or the processing cores are configured to convert the data table or the data file to the generated data table according to the generated schema structure. For example, converting the data table or the data file may include parsing data from the code-description table and converting the parsed data to the Enum type schema element of the schema structure. The resulting Enum type schema elements, including the data table updated with the corresponding code-description table elements for each record, and the schema structure, are stored in a relevant location in the one or more NVM dies of the plurality of NVM dies 316a-316n, 322a-322n. Furthermore, when converting the data table or the data file to the Enum type schema element, at least a portion of the reference to the code-description table may be removed, as the code-description table elements are stored with the corresponding data table records that formerly referenced the code description table. By removing the reference to the code-description table, memory space may be saved, and the read and/or write speed may be improved.

At block 416, the controller and/or processor is configured to read and convert the data records of the received file to the Enum type schema elements of the identified schema structure created at block 408. After parsing the first portion of data (e.g., the first portion of the data table at block 404), additional data from the file may be consumed and parsed. At block 418, when the controller and/or processor identifies a mismatch between the additional data of the received file and the schema element, such as a new field not matched to either a first schema element or a second schema element (in some embodiments, a plurality of schema elements), a change of data type, or a missing field, the controller and/or processor sends the mismatched data to an exception queue of an exception handler.

At the exception queue, the controller and/or processor identifies the type of mismatch and updates the structure of the schema to remedy the mismatch at block 420. For example, the controller and/or processor may change or update the field type to match a mismatched data type and produce a new schema structure reflecting the update. Likewise, the controller and/or processor may add a new field to the schema resulting in a new column in the table to allow for a missing field to have a location in the data table and potentially flagging the new field as either required or optional. The controller and/or processor may additionally update the schema structure to change a field designation of required to optional. Furthermore, when updating the Enum type schema structure, each schema element of the one or more schema elements may also be updated. At block 422, the controller and/or processor converts, appends, and reads all the data records from the old Enum type schema structure to the updated schema structure that includes the mismatched data. For example, the previously converted records of the data table are converted to the updated Enum type schema.

After completing the process at block 422 or if a mismatch has not been identified, the controller and/or processor determines if the exception queue is empty at block 424. If the exception queue is not empty, then the controller and/or processor continues to identify the mismatch and update the schema structure at block 420. However, if the exception queue is empty at block 424, then the controller and/or processor determine if the last data record of the file has been reached at block 426. If the last data record of the file has not been reached, then the controller and/or processor continues to read and convert data records to the identified Enum type schema structure at block 416. The method 400 continues to block 418 and so forth. When the last data record of the file has been reached at block 426, the schema detection and migration method 400 is completed at block 428. When the method 400 is completed, the controller and/or processor may be configured to execute database operations, such as a query, a record insert, a record update, and a record deletion, on the data table of the schema.

Figure 5A:
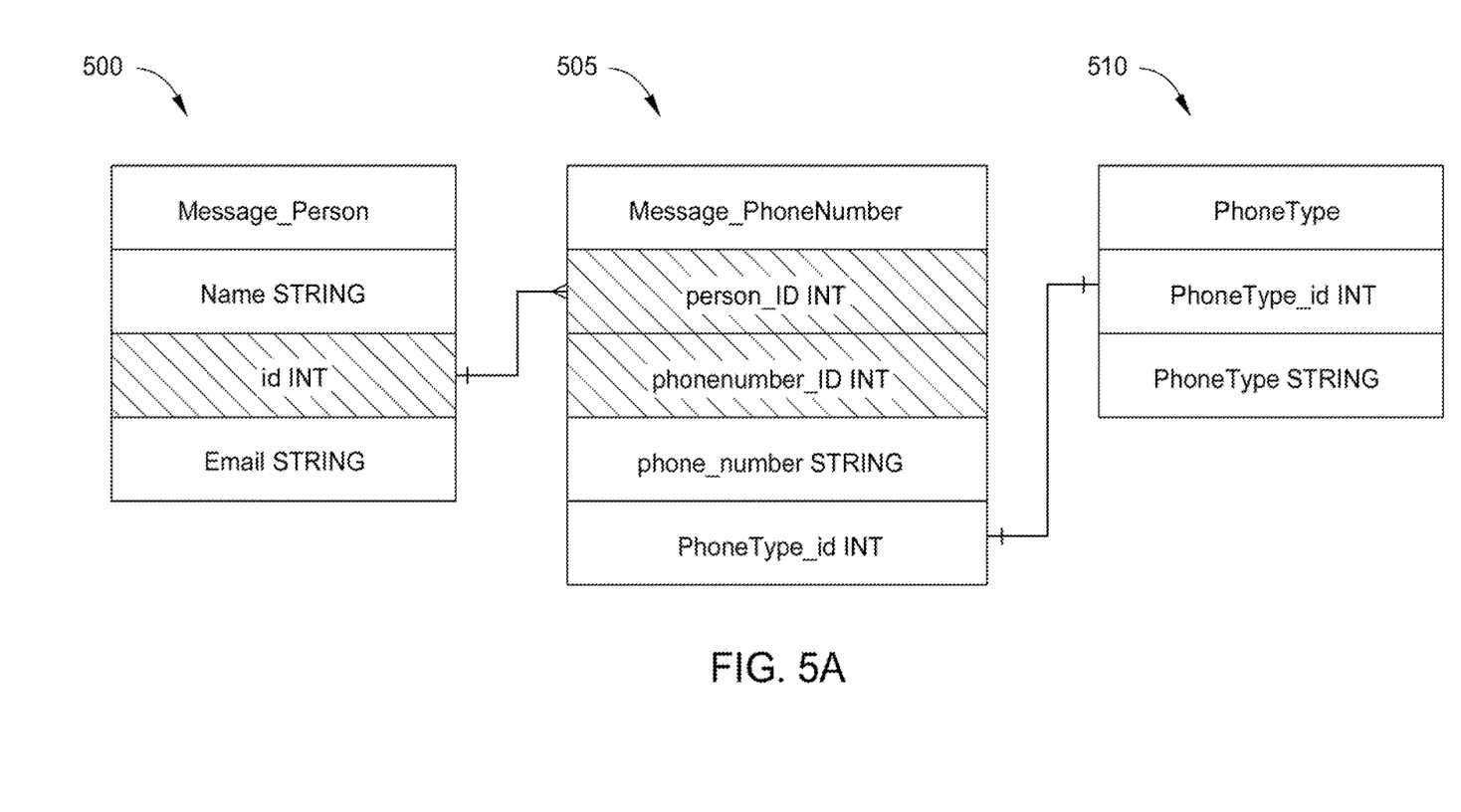
FIG. 5A is a table representation of a SQL database entry, according to disclosed embodiments.

FIG. 5A is an example table representation of a SQL database entry 500, according to disclosed embodiments. The SQL database entry 500 may be the data file or data table loaded at block 404 or 402b of the method 400. The SQL database entry 500 includes a "Message_Person" field, a "Name STRING" field, an "id INT" field, and an "Email STRING" field. The "id INT" field may be a key, such that the key is a unique identifier to a row of the data table. Furthermore, the SQL database entry 500 may have a one to many relationship to a second table 505. In some embodiments, the relationship may be a one to one relationship to the second table 505.

The second table 505 includes a "Message_PhoneNumber" field, a "phonenumber_ID INT" field, a "phone_number STRING" field, and a "PhoneType_id INT" field, having a one to one or one to many relationship with a code-description table 510. The "person_ID INT" field and the "phonenumber_ID INT" are keys, such that each field is a unique identifier to a row of the data table. After completing the method 400, the resulting table includes the parsed Enum type schema elements. The resulting table includes a "PhoneType" schema element, a "PhoneType_id INT"

schema element, and a "PhoneType STRING" schema element. The "PhoneType_id INT" may be a descriptor to relate the data file or data table to the schema.

Figure 5B:
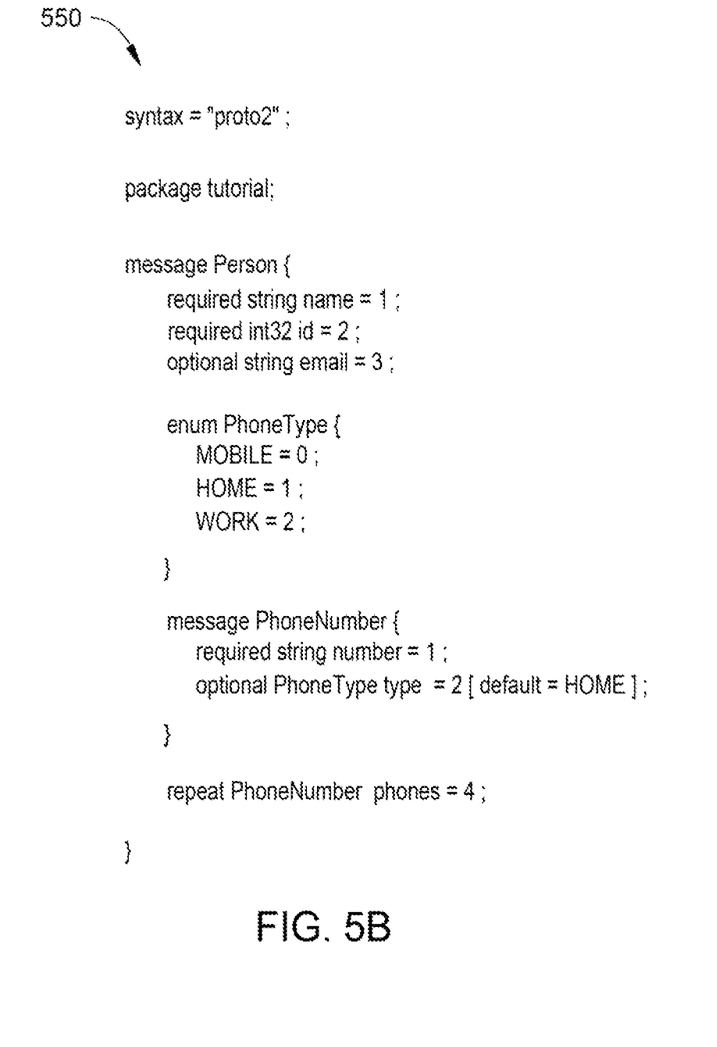
FIG. 5B is a code representation of a Protobuf schema of the SQL database entry of FIG. 5A, according to disclosed embodiments.

FIG. 5B is a serialized code representation 550 of the SQL database entry 500 and 505 of FIG. 5A, after parsing the code-description table to be included in the schema describing the database entry 500, according to disclosed embodiments. The Protobuf schema 550 includes a "message Person" field, an "enum PhoneType" field, a "message PhoneNumber" field, and a "repeated PhoneNumber" field. Each of the fields of the Protobuf schema 550 may include one or more dependencies or sub-fields. For example, the "message Person" field includes a required "string name" field, a required "int32 id" field, and an optional "string email" field.

During the parsing of the data file or the data table at block 414 of the method 400, the resulting schema may be the Protobuf schema 550 illustrated, thus reducing the total space needed to store the data file or the data table. Because the Protobuf schema 550 includes the formerly separate data from the code-description table 510, the resulting table records defined by the schema include formerly separate data elements into the records. By including the code description table 510 data elements with each corresponding record of the SQL database entry 500 and the second table 505, the table to table relationship need no longer be maintained, and further database operations on these records will be faster and more efficient.

By matching a portion of a data file to a reference of a code-description table including a plurality of descriptors and converting the data file to an Enum type schema structure, the total size of the data file or the data table may be reduced and the performance of the data storage device may be improved.

In one embodiment, a data storage device is disclosed, including one or more memory modules, and a controller comprising a processor configured to perform a method for data schema detection and migration. In embodiments, the method includes identifying in portion of a file, a reference to a code-description table comprising a plurality of descriptors, creating a schema for the portion of the file, the schema comprising a schema element comprised of two or more of the plurality of descriptors, converting the file to a table according to the schema, and storing the table and schema in the one or more memory modules.

The schema element is an enumerated data type. The converting the file includes removing at least a portion of the reference to the code-description table. The method further includes identifying a mismatched field that includes a field of the file that is not matched to the schema element or a second schema element. The mismatched field comprises one of a new field type, a changed field type, and a missing field type. The schema is updated to an updated schema based on the mismatched field type. The previously converted portions of the file are converted based on the updated schema.

In another embodiment, a controller for a data storage device is disclosed, that includes an I/O to one or more memory devices, and a processor configured to execute a method for data schema detection and migration. In embodiments, the method includes receiving a portion of a file comprising a plurality of records, detecting a reference in one of the records to a code-description table, defining a schema for the file based on the data types in at least one record of the plurality of records, comprising at least one schema element comprising at least two descriptors of the code-description table, and storing data from the file and the schema in the one or more memory devices.

The method further includes removing the reference to the code-description table. The method further includes defining the at least one schema element as an enumerated data type. The storing data from the file includes defining a data table based on the plurality of records and the schema. The method further includes executing one of a query, a record insert, a record update, and a record deletion, on the data table. The method further includes detecting a field mismatch comprising one of detecting a new field not present in the schema, a change of data type, or a missing field. The method further includes generating a new schema by updating the schema based on the field mismatch, where updating the schema comprises one of updating the schema to include the new field, updating the data type, and updating the schema change a field designation to one of required and optional. The method further includes updating the data table based on the new schema. The method further includes converting additional data from the file to the data table, based on the new schema. The method further includes identifying a type of one of the plurality records of as one of hierarchy, repeated, and optional.

In another embodiment, a system for storing data is disclosed, that includes one or more memory means, and an SSD controller means configured to carry out a method for data schema detection and migration. In embodiments, the method includes detecting field hierarchy of a file and a reference to a code-description table, defining a schema means based on the field hierarchy, the schema comprising a schema element describing a portion of the code-description table comprising a plurality descriptors, and defining a data table based on the schema means and the file.

The schema element includes a list of at least two of the plurality of descriptors of the code-description table. The method further including typing the schema element as an enumerated data type.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory modules; and
a controller comprising a processor configured to perform a method for data schema detection and migration, the method comprising:
identifying, in a portion of a first file, a reference to a code-description table comprising a plurality of descriptors;
creating a schema for the portion of the first file, the schema comprising a schema element comprised of two or more of the plurality of descriptors;
converting the first file to a table according to the schema;
storing the table and schema in the one or more memory modules;
identifying a mismatch between data of the first file and a second file;
updating a field type to match a mismatched data type by adding a new field to the schema resulting in a new column in the table to allow for a missing field to have a location in the table;
maintaining an exception queue;
determining the exception queue is empty;
stopping identifying mismatches;

determining a last data record has been reached; and
executing a plurality of database operations comprising:
a query on the table;
a record insert on the table;
a record update on the table; and
a record deletion on the table.

2. The data storage device of claim 1, wherein the schema element is an enumerated data type.

3. The data storage device of claim 2, wherein converting the first file comprises removing at least a portion of the reference to the code-description table.

4. The data storage device of claim 3, wherein the method further comprises identifying a mismatched field, comprising a field of the first file that is not matched to the schema element or a second schema element.

5. The data storage device of claim 4, wherein the mismatched field comprises one of a new field type, a changed field type, and a missing field type.

6. The data storage device of claim 4, wherein the schema is updated to an updated schema based on the mismatched field type.

7. The data storage device of claim 6, wherein previously converted portions of the first file are converted based on the updated schema.

8. A controller for a data storage device, comprising:
an I/O to one or more memory devices; and
a processor configured to execute a method for data schema detection and migration, the method comprising:
receiving a portion of a first file comprising a plurality of records;
detecting a reference in one of the records to a code-description table;
defining a schema for the first file based on the data types in at least one record of the plurality of records, comprising at least one schema element comprising at least two descriptors of the code-description table;
storing data from the first file and the schema in the one or more memory devices;
identifying a mismatch between data of the first file and a second file;
updating a field type to match a mismatched data type by adding a new field to the schema resulting in a new column in a data table to allow for a missing field to have a location in the data table;
maintaining an exception queue;
determining the exception queue is empty;
stopping identifying mismatches;
determining a last data record has been reached; and
executing a plurality of database operations comprising:
a query on the data table;
a record insert on the data table;
a record update on the data table; and
a record deletion on the data table.

9. The controller of claim 8, the method further comprising wherein the reference to the code-description table is removed.

10. The controller of claim 9, the method further comprising wherein the at least one schema element defined as an enumerated data type.

11. The controller of claim 10, wherein storing data from the first file comprises defining the data table based on the plurality of records and the schema.

12. The controller of claim 11, wherein the method further comprises executing one of a query, a record insert, a record update, and a record deletion, on the data table.

13. The controller of claim 11, wherein the method further comprises detecting a field mismatch comprising one of detecting a new field not present in the schema, a change of data type, or a missing field.

14. The controller of claim 13, wherein the method further comprises generating a new schema by updating the schema based on the field mismatch, wherein updating the schema comprises one of:
updating the schema to include the new field;
updating the data type; and
updating the schema change a field designation to one of required and optional.

15. The controller of claim 14, wherein the method further comprises updating the data table based on the new schema.

16. The controller of claim 14, wherein the method further comprises converting additional data from the file to the data table, based on the new schema.

17. The controller of claim 8, wherein the method further comprises identifying a type of one of the plurality records of as one of hierarchy, repeated, and optional.

18. A system for storing data, comprising:
one or more memory means; and
an SSD controller means configured to carry out a method for data schema detection and migration, the method comprising:
detecting field hierarchy of a first file and a reference to a code-description table;
defining a schema means based on the field hierarchy, the schema comprising a schema element describing a portion of the code-description table comprising a plurality of descriptors;
defining a data table based on the schema means and the first file;
identifying a mismatch between data of the first file and a second file;
updating a field type to match a mismatched data type by adding a new field to the schema resulting in a new column in the data table to allow for a missing field to have a location in the data table;
maintaining an exception queue;
determining the exception queue is empty
stopping identifying mismatches;
determining a last data record has been reached; and
executing a plurality of database operations comprising:
a query on the data table;
a record insert on the data table;
a record update on the data table; and
a record deletion, on the data table.

19. The system of claim 18, wherein the schema element comprises a list of at least two of the plurality of descriptors of the code-description table.

20. The system of claim 19, the method further including typing the schema element as an enumerated data type.

* * * * *